US006246397B1

(12) United States Patent
Vossler

(10) Patent No.: US 6,246,397 B1
(45) **Date of Patent: *Jun. 12, 2001**

(54) SCREEN SAVER COMPUTER PROGRAM PROHIBITION BASED ON STORAGE DEVICE ACTIVITY

(75) Inventor: Stephen P. Vossler, Sioux Falls, SD (US)

(73) Assignee: Gateway, Inc., North Sioux City, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,487

(22) Filed: Jul. 30, 1997

(51) Int. Cl.[7] ................................ G09G 5/00; G06F 1/28

(52) U.S. Cl. ............................................ 345/204; 713/300

(58) Field of Search .................................... 345/204, 211, 345/212, 507, 508; 713/300, 310, 320, 322, 323, 324, 330, 340

(56) References Cited

U.S. PATENT DOCUMENTS

| | | | | |
|---|---|---|---|---|
| 4,722,005 | | 1/1988 | Ledenbach | 358/168 |
| 5,396,635 | * | 3/1995 | Fung | 713/323 |
| 5,448,262 | | 9/1995 | Lee et al. | 345/212 |
| 5,457,668 | | 10/1995 | Hibino et al. | 369/32 |
| 5,485,569 | | 1/1996 | Goldman et al. | 395/159 |
| 5,509,139 | | 4/1996 | Ayash et al. | 395/869 |
| 5,511,202 | * | 4/1996 | Combs et al. | 395/750.05 |
| 5,511,204 | | 4/1996 | Crump et al. | 395/750 |
| 5,513,359 | | 4/1996 | Clark et al. | 395/750 |
| 5,530,879 | | 6/1996 | Crump et al. | 395/750 |
| 5,548,764 | | 8/1996 | Duley et al. | 395/750 |
| 5,551,043 | | 8/1996 | Crump et al. | 395/750 |
| 5,738,527 | * | 4/1998 | Lundberg | 434/322 |
| 5,821,924 | * | 10/1998 | Kikinis et al. | 345/212 |
| 5,925,129 | * | 7/1999 | Combs et al. | 713/300 |

OTHER PUBLICATIONS

"Display Power Management Signaling (DPMS) Standard", Video Electronics Standards Association, Version 1.0, Revision 1.0, first page unnumbered, pp. ii–iii, and 4–12 (Aug. 20, 1993).

* cited by examiner

*Primary Examiner*—William A. Cuchlinski, Jr.
*Assistant Examiner*—Thu Nguyen
(74) *Attorney, Agent, or Firm*—Schwegman, Lundberg, Woessner & Kluth, P.A.; Kenneth J. Cool

(57) ABSTRACT

The prohibition of screen saver computer program activation based on storage device activity is disclosed. The screen saver program is activated by the operating system of the computer after a period of inactivity of at least one storage device (such as a hard disk drive) has been detected. In an alternative embodiment, the screen saver program is activated by the operating system of computer after both a period of inactivity of at least one storage device and at least one input device (such as a keyboard) have been detected.

8 Claims, 6 Drawing Sheets

SCREEN SAVER COMPUTER PROGRAM PROHIBITION BASED ON STORAGE DEVICE ACTIVITY

FIELD OF THE INVENTION

This invention relates generally to the functionality of operating systems, and more particularly to such operating systems that prohibit activation of a screen saver computer program based on activity of storage devices of a computer.

BACKGROUND OF THE INVENTION

In many environments, computers usually remain on for many hours at a time. Special-purpose computers, such as file servers, are usually never turned off. Therefore, peripherals such as monitors are also turned on for extended lengths of time.

In the case of older monitors, this situation creates a potential for damage to the monitor. If left turned on and displaying an unchanging image, the monitor may develop burn in. The image displayed on the monitor may burn itself in to the monitor permanently, such that a ghosting of the image is always visible. In the case of newer monitors, the potential for burn in is slight. However, potential for unauthorized viewing of information on a monitor of a computer may occur. For example, if a computer is left on while a user goes to lunch, any sensitive information on the computer screen is easily read by even casual passers by. This leakage of sensitive data may be more serious than the physical damage resulting from burn in.

A solution to this problem is the screen saver program, such as that available commercially as After Dark, from Berkeley Systems of Berkeley, Calif. When the operating system detects that the user has not utilized an input device, such as a computer keyboard or a mouse or other pointing device, for a predetermined length of time, the operating system activates the screen saver program.

The screen saver program may blank out the screen, so that information the user had been working on is no longer displayed on the screen, and so that burn in is prevented. Alternatively, the program may display a changing sequence of images, such as a scrolling marquee. In a further alternative, the program may cause the computer monitor to enter a power conservation mode, which causes the monitor to turn off its display.

The prior art operating system activation of such screen saver programs assumes that a user is not using the computer if the user has not utilized an input device for more than the predetermined length of time. This is not always the case. For example, a user may be scanning a hard disk drive (HDD) for errors, or defragmenting the HDD, processes which can take several minutes, and during which the user typically does not utilize the input device. In these situations, the screen saver may erroneously be activated, because a period of input device inactivity has occurred. This may be an annoyance for the user, because such computer programs typically display status information on the screen, which the user may want to view. In addition, the activation of the screen saver may also cause the error-checking or the defragmenting of the HDD to stop. In some cases, the activation of the screen saver program may potentially corrupt the HDD. Finally, some screen saver programs significantly utilize the processor of the computer, which may make the defragmenting or other process also being executed by the processor run less efficiently.

Therefore, there is a need for operating system to prohibit activation of a screen saver program in response to detection of storage device activity. Such operating system activation of a screen saver program should thus allow for the possibility that a user of the computer may be performing an activity that does not require input device inactivity. Such operating system activation of a screen saver program should activate only if the user is truly not utilizing the computer.

SUMMARY OF THE INVENTION

The above-mentioned shortcomings are addressed by the invention, which prohibits activation of a screen saver program upon detecting activity of a storage device of a computer. In one embodiment of the invention, activity of one or more storage devices is required to cease prior to activation of a screen saver program by an operating system. Thus, activation of the screen saver program is prohibited until the storage devices have timed out.

The present invention therefore is advantageous in that the screen saver program is activated only if an inactivity period of the storage device of the computer, such as a hard disk drive, has been detected. This prevents storage device-intensive tasks, such as defragmentation and back up, to occur without the activation of the screen saver program. The display screens for such tasks thus remain visible. Moreover, any diversion of processor bandwidth to the execution of screen saver programs, which may slow down the execution of the defragmentation or other task, is prevented.

The invention relates to computers, computerized methods, and computer-readable media. Still other and further advantages, embodiments, and aspects of the invention will become apparent by reference to the drawings, and by reading the following detailed description.

BRIEF DESCRIPTION OF THE DRAWINGS

FIG. 2(*b*) is a flow chart showing a screen saver program according to another embodiment of the invention;

FIG. 3(*b*) is a flow chart showing a screen saver program according to still yet another embodiment of the invention; and, FIG. 4 is a diagram of a typical computer in conjunction with which an embodiment of the invention may be implemented.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present inventions is defined only by the appended claims.

Figure 1:
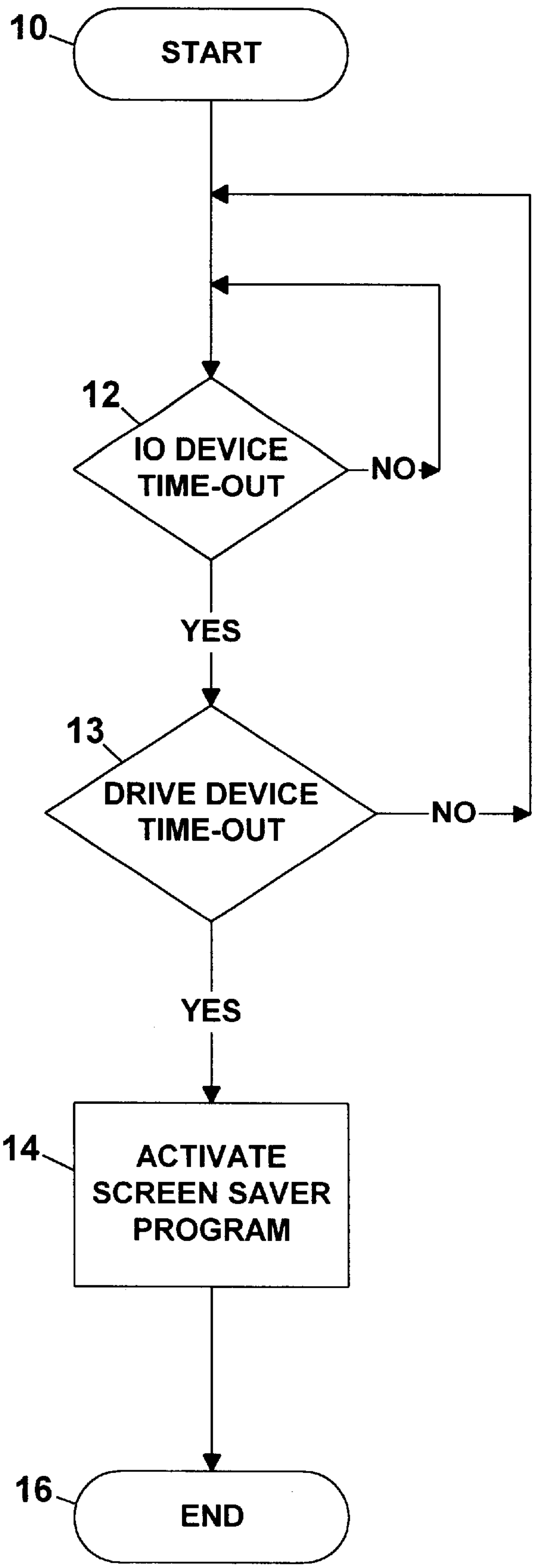
FIG. 1 is a flow chart of the operating system activation of a screen saver program according to one embodiment of the invention.

Referring first to FIG. 1, a flow chart of a computerized method according to one embodiment of the invention is shown. The flow chart of FIG. 1 is an event-driven method performed within the operating system of a computer. Starting from step 10, the method in step 12 preferably detects whether each of one or more input devices of a computer have timed out—that is, whether a period of inactivity of each of one or more input devices has exceeded a predetermined timeout threshold preferably set by the computer user. This is the standard timeout criteria for activation of a screen saver program. The one or more input devices preferably includes a keyboard of the computer, as well as a pointing device of the computer such as a mouse, trackball, or touch pad. The invention is not so limited, however.

If all of the one or more input devices (i.e., input/output devices) have not timed out, the method remains at step 12. When they have timed out, however, the method proceeds to step 13. In step 13, the program preferably detects whether each of the one or more storage devices of the computer have each timed out—that is, whether a period of inactivity of each of the one or more storage devices has exceeded a predetermined timeout threshold preferably set by the computer user. This is the storage device-based timeout criteria for activation of the screen saver program. The one or more storage devices may include a hard disk drive, a floppy disk drive, an optical disk drive, as well as a tape storage drive, although the invention is not so limited.

If all of the one or more storage devices have not timed out, the method returns to step 12. Otherwise, the method proceeds to step 14. In step 14, the screen saver program is activated, as known within the art, and as will be described. The screen saver program in step 14 preferably ensures that the current information shown on the display device of the computer is not viewable until an input device of the computer is active again (e.g., a key has been pressed on the keyboard, or the mouse has been moved). The invention is not limited to any particular screen saver program in step 14. The method of FIG. 1 ends at step 16.

Figure 2A:
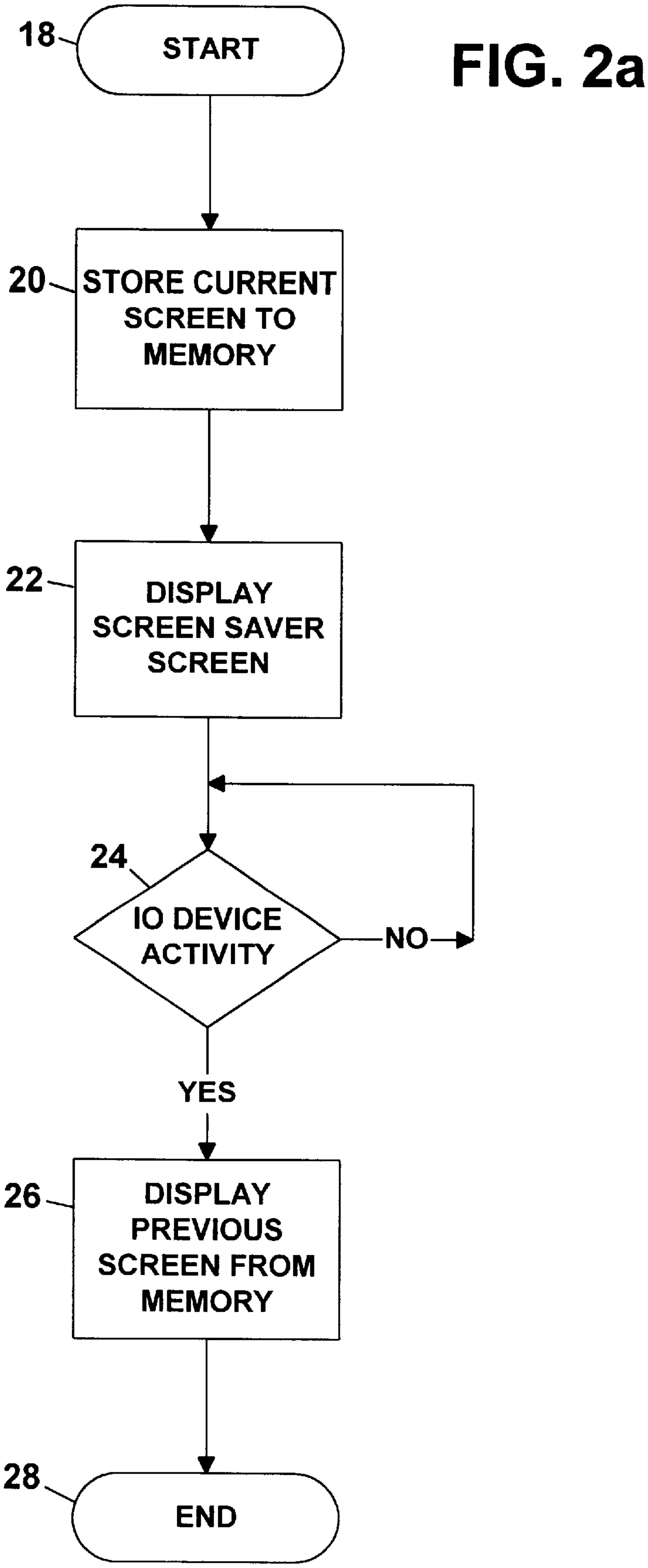
FIG. 2(*a*) is a flow chart showing a screen saver program according to an embodiment of the invention.
Figure 2B:
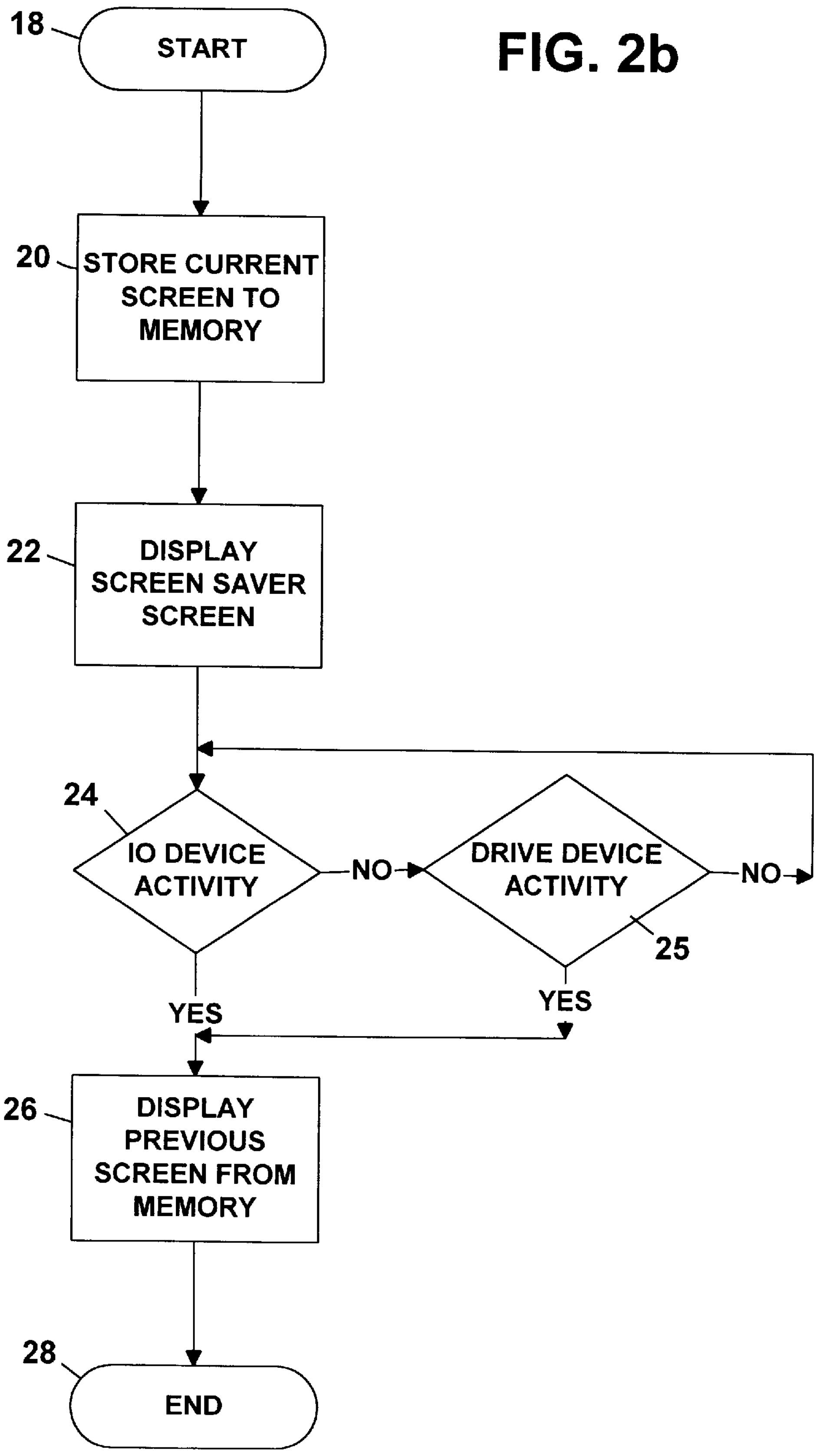

Referring now to FIG. 2(*a*), a flow chart of the screen saver program in step 14 of FIG. 1 according to one embodiment of the invention is shown. The invention is not limited to the screen saver program of FIG. 2(*a*). From step 18, the program in step 20 stores the current screen of (first) information to system memory, or to a storage device of the computer, as is known within the art, for later recovery.

In step 22, the screen saver program displays a screen of (second) information previously stored on a storage device or a memory of the computer, for display on the screen of the display device of the computer in lieu of the current display screen. The invention is not limited to any particular screen saver information. In one embodiment, the information is a screen of black pixels (i.e., no light). Display of this screen causes the display device to become blank, so that burn in is prevented, and so that casual passers by are not able to determine what the computer user is currently working on. In another embodiment, the screen saver information is a repeating sequence of different screens, such as a scrolling marque. Because the screens constantly change, no one screen is shown for an extended length of time, which prevents burn-in. Casual passers by are also not able to determine what the computer user is currently working on.

In step 24, the screen saver routine determines whether input (I/O) device activity has occurred, in an event-driven manner. Until such activity has occurred, the screen saver screen displayed in step 22 remains on the display device of the computer. Once activity on any input device (e.g., the mouse has been moved, or a key on the keyboard has been depressed) has occurred, in step 26 the screen saver program redisplays the (first) information previously stored in step 20. The routine ends at step 28.

Thus, the screen saver program of FIG. 2(*a*), in conjunction with the method of FIG. 1, is activated when input device and storage device inactivity are detected. This is advantageous because if the computer is performing a disk-intensive function that does not require user intervention via an input device, the operating system of the computer will not cause the screen saver program to be activated, even though the input device may have itself timed out. Thus, the user still receives visual confirmation of such disk intensive tasks as defragmenting or backing up a hard disk drive.

Furthermore, insofar as the alternative information displayed by screen saver programs within the art may include quite elaborate animated display screens, the display of such animated screens burdening the processor of the computer, the accomplishment of a defragmentation or other task may be inadvertently slowed down. Therefore, prohibiting the screen saver program from activating until both I/O and storage device activity have timed out means that such tasks will not be slowed down.

Note further that in the screen saver program of FIG. 2(*a*), the screen saver program is deactivated (that is, the screen previously displayed is redisplayed) after detecting input device activity. Thus, the detection of storage device activity does not trigger the deactivation of the screen saver program.

Referring next to FIG. 2(*b*), a flow chart of another screen saver program in step 14 of FIG. 1 according to one embodiment of the invention is shown. The invention is not limited to the screen saver program of FIG. 2(*b*). From step 18, the program in step 20 stores the current screen of (first) information to system memory, or to a storage device of the computer, as is known within the art, for later recovery.

In step 22, the screen saver program displays a screen of (second) information previously stored on a storage device or a memory of the computer, for display on the screen of the display device of the computer in lieu of the current display screen. The invention is not limited to any particular screen saver information. In step 24, the screen saver routine determines whether input (I/O) device activity has occurred, in an event-driven manner. If activity on the input devices has not occurred, in step 25 the screen saver program determines whether storage device activity has occurred, also in an event-driven manner. If either such activity has occurred (that is, either I/O device or storage device activity), the screen saver screen displayed in step 22 remains on the display device of the computer. Thus, in step 26 the screen saver program redisplays the (first) information previously stored in step 20. The routine ends at step 28.

Thus, the screen saver program of FIG. 2(*b*), in conjunction with the method of FIG. 1, is activated when input device and storage device inactivity are detected. However, unlike the screen saver program of FIG. 2(*a*), in the screen saver program of FIG. 2(*b*), the screen saver program is deactivated (that is, the screen previously displayed is redisplayed) after detecting either input device activity or storage device activity.

Figure 3A:
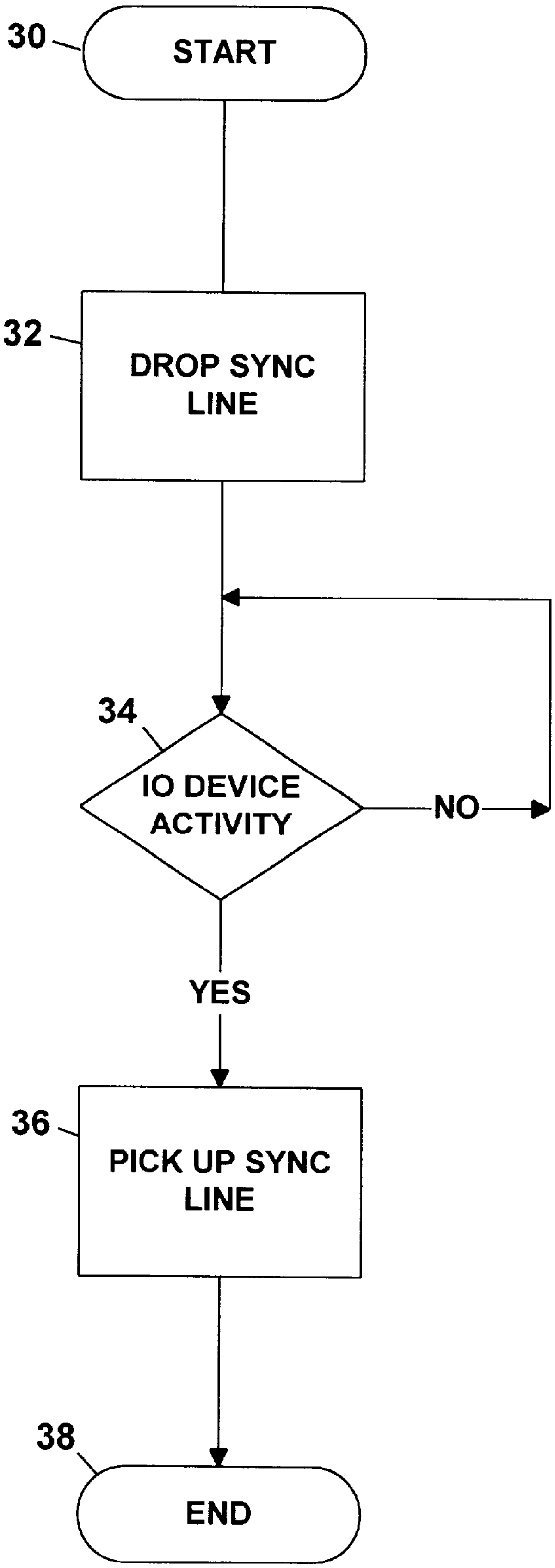
FIG. 3(*a*) is a flow chart showing a screen saver program according to still another embodiment of the invention.
Figure 3B:
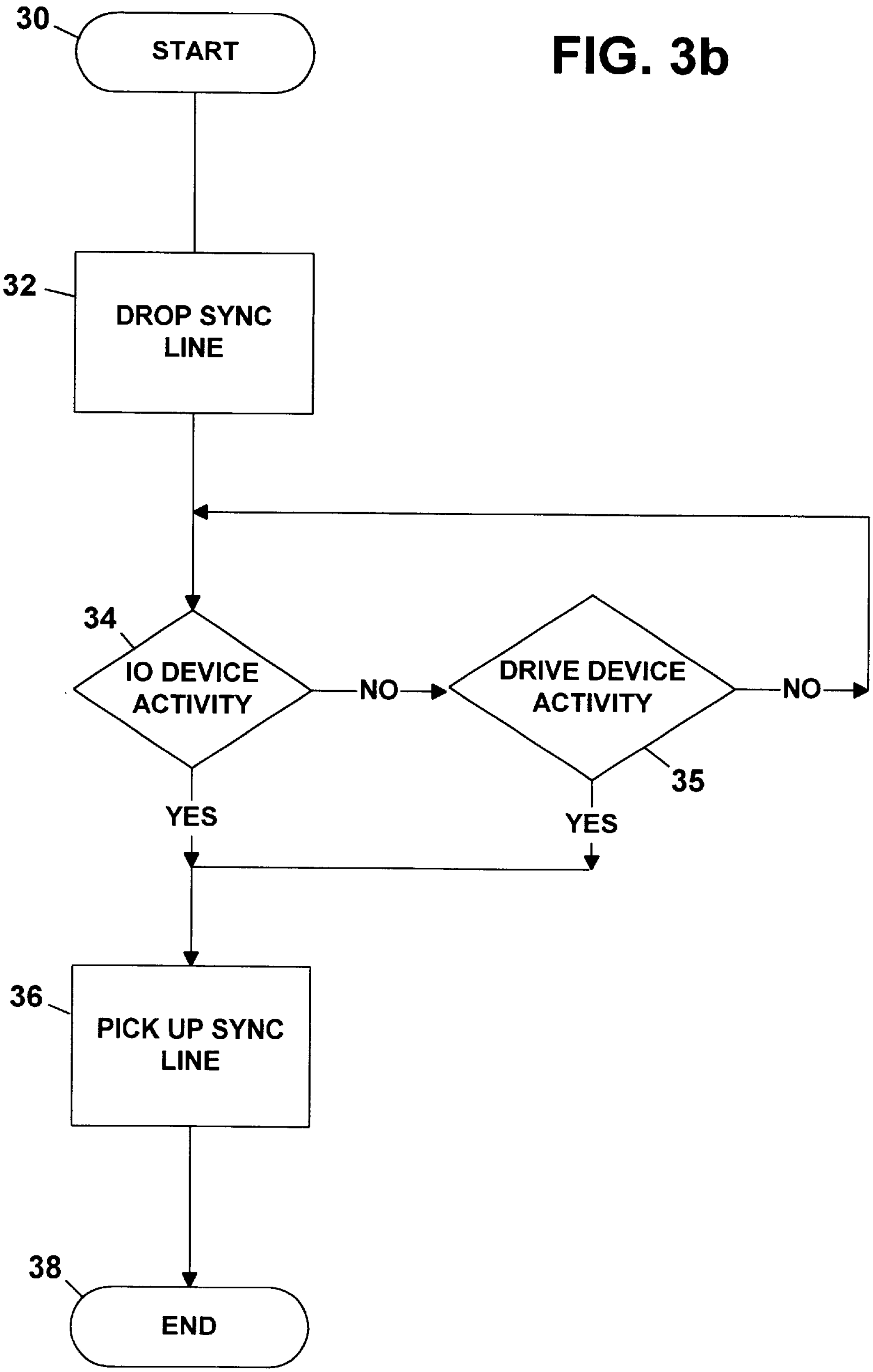

Referring next to FIG. 3(*a*), a flow chart of the screen saver program in step 14 of FIG. 1 according to still another embodiment of the invention is shown. Note again that the invention is not so limited to such a screen saver program. From step 30, the routine in step 32 forces the display device to enter a power-conservation mode. EPA Energy Star-compliant display devices have such a power-conservation mode, entry into which causes the screen of the display device to turn off, although the display device itself remains turned on in a low-power consumption mode. One such display device is the Gateway 2000 Vivitron 1100, available from Gateway 2000, Inc., of North Sioux City, S. Dak. When entering power-conservation mode, the display device consumes typically only eight watts of energy, as opposed to 130 watts that are typically consumed. As shown in step 30, entry into power-conservation mode is accomplished by dropping the sync line of the monitor. Because the screen of the display device is turned off, burn-in is prevented, and passers by are not able to determine what the computer user had been most recently been working on.

The entrance of an EPA Energy Star-compliant monitor into a power-conservation mode in conjunction with the dropping of the sync line of the monitor is well known within the art. For example, the Display Power Management Signaling (DPMS) standard promulgated by the Video Electronics Standards Association, the version 1.0, revision 1.0, of which is hereby incorporated by reference, specifies the standard for DPMS architecture such that the dropping of the sync line of the monitor causes it to enter a power-conservation mode. A monitor or other display device conforming to the DPMS standard as articulated in the above-identified reference is preferred.

In step 34, the screen saver routine determines whether any input (I/O) device activity has occurred. Until any such activity has occurred, the monitor remains in power-conservation mode. Once activity on any input device has occurred, in step 36 the screen saver program forces the display device to exit the power-conservation mode. This refers to turning on the screen of the display device, so that the information the computer user had most recently been working on is again visible on the screen. Exit out of the power-conservation mode (i.e., deactivation of the screen saver program) is accomplished by reasserting or picking up of the sync line of the monitor previously dropped in step 32. This is also understood within the art, as evidenced by the DPMS standard already incorporated herein by reference. The routine ends at step 38.

Thus, the screen saver program of FIG. 3(*a*), in conjunction with the method of FIG. 1, is activated when input device and storage device inactivity are detected. This is advantageous because if the computer is performing a disk-intensive function that does not require user intervention via an input device, the operating system of the computer will not cause the screen saver program to be activated, even though the input device may have itself timed out. Thus, the user still receives visual confirmation of such disk-intensive tasks as defragmenting or backing up a hard disk drive. In the screen saver program of FIG. 3(*a*), the power-conservation mode is exited after detecting input device activity. Thus, the detection of storage device activity does not trigger the exiting of power-conservation mode.

Referring next to FIG. 3(*b*), a flow chart of the screen saver program in step 14 of FIG. 1 according to still yet another embodiment of the invention is shown. Note again that the invention is not so limited to such a screen saver program. From step 30, the routine in step 32 forces the display device to enter a power-conservation mode. EPA Energy Star-compliant display devices have such a power-conservation mode, entry into which causes the screen of the display device to turn off, although the display device itself remains turned on in a low-power consumption mode. As shown in step 30, entry into power-conservation mode is accomplished by dropping the sync line of the monitor.

In step 34, the screen saver routine determines whether any input (I/O) device activity has occurred. Until any such activity has occurred, the monitor remains in power-conservation mode. If activity on the input devices has occurred, in step 35 the screen saver program determines whether storage device activity (such as a hard drive access, read or write) has occurred. If either I/O device or storage device activity has occurred, then in step 36 the screen saver program forces the display device to exit the power-conservation mode. Exit out of the power-conservation mode (i.e., deactivation of the screen saver program) is accomplished by reasserting or picking up of the sync line of the monitor previously dropped in step 32. The routine ends at step 38.

Thus, the screen saver program of FIG. 3(*b*), in conjunction with the method of FIG. 1, is activated when input device and storage device inactivity are detected. However, unlike the screen saver program of FIG. 3(*a*), in the screen saver program of FIG. 3(*b*), the screen saver program forces the display device to exit power-conservation mode after detection of either input device activity or storage device activity.

Figure 4:
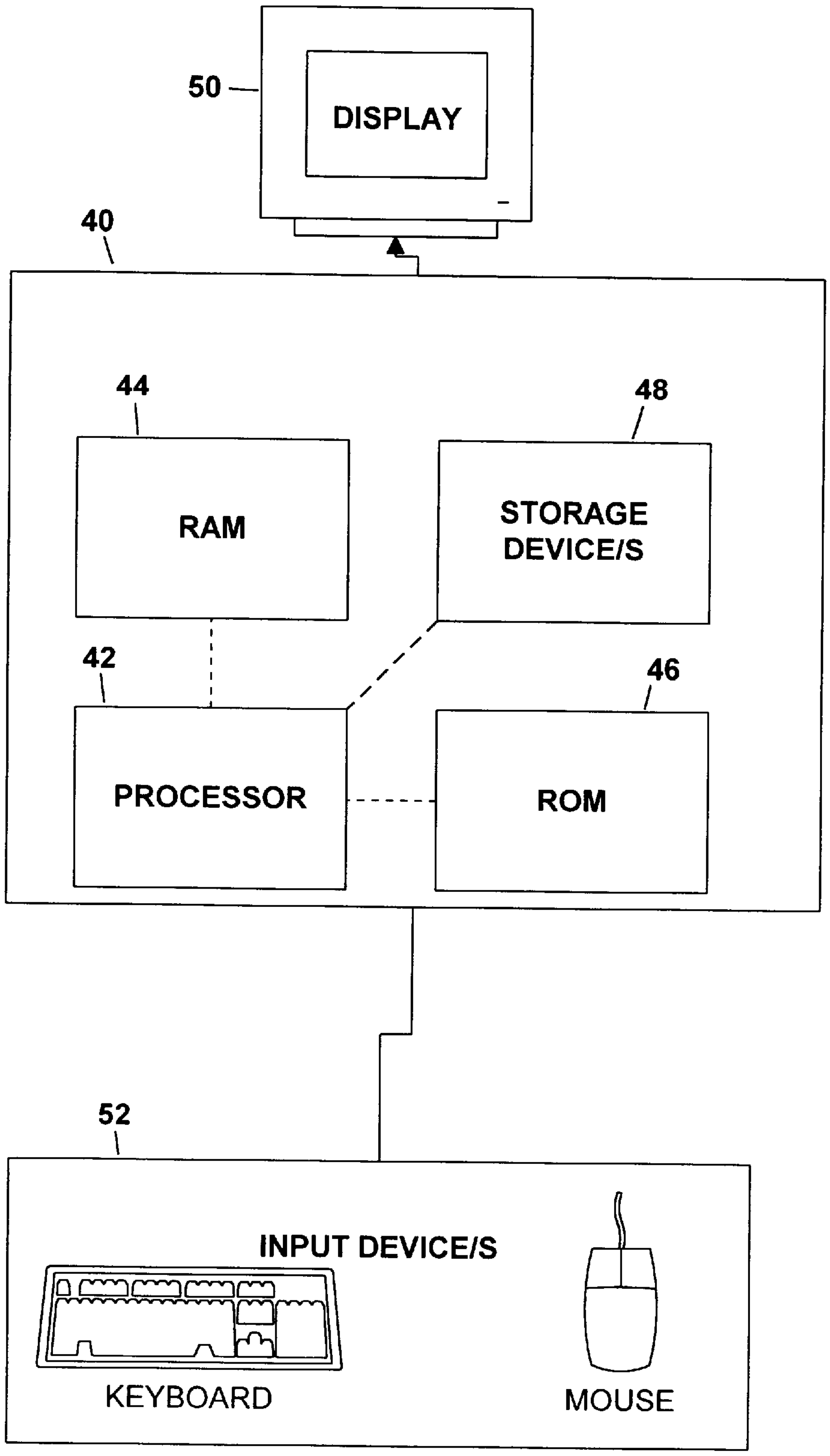

Referring now to FIG. 4, a typical computer in conjunction with which an embodiment of the invention may be implemented is shown. Computer 40 includes processor 42 (preferably, an Intel Pentium processor), random-access memory 44 (preferably, at least sixteen megabytes), read-only memory 46, and one or more storage devices 48. Storage devices 48 may include, but are not limited to, a hard disk drive (HDD), a floppy disk drive (FDD), an optical disc player such as a compact-disc read-only-memory (CD-ROM) drive, a zip drive, and a tape cartridge drive. The operating system activation of a screen saver program of the invention, a flowchart of one embodiment of which has been shown in and described in conjunction with FIG. 1, is executed from a memory (e.g., RAM or ROM) by processor 42, and is not separately shown in FIG. 3. Computer 40 may be either a desktop or portable (e.g., notebook or laptop) computer.

The dotted lines between processor 42 and RAM 44, ROM 46 and storage devices 48 indicates that processor 42 is at least logically coupled to each of these components, and may be physically coupled as well, although the invention is not so limited. Furthermore, in one embodiment of the invention, computer 40 is running a version of the Microsoft Windows operating system. In this embodiment, configuration of activation of the screen saver program (i.e., the predetermined length of time of inactivity of the storage device or the input device after which the screen saver program is activated) is accomplished through an associated control panel of the operating system, as is known within the art.

As shown in FIG. 4, display device 50 and one or more input devices 52 are external to computer 40. The invention is not so limited. In the case of a portable computer display device 50 and one or more input devices 52 are typically integrated into a housing of computer 40. Display device 50 in one embodiment includes a screen which is a cathode-ray tube (CRT), while in another embodiment includes a screen which is a flat panel display such as a liquid crystal display (LCD). Input devices 52 may include, but are not limited to, a computer keyboard having a plurality of keys, as well as a pointing device such as a mouse, a touch pad, a wheel, a joystick, a point stick, and a trackball.

The screen saver program is executed on computer 40 of FIG. 4 as has been described. Upon the event of detection of an inactivity period of at all of storage devices 48, and of all of input devices 52, occurring, the screen saver program is activated by the operating system. This causes the information displayed on display device 50 to be replaced with screen saver information, as has been described in conjunction with FIG. 2(*a*) and FIG. 2(*b*), or causes display device 50 to enter a power-conservation mode, as has been described in conjunction with FIG. 3(*a*) and FIG. 3(*b*). When activity from any input device is subsequently detected, the information previously displayed on device 50 is redisplayed, or device 50 is forced to exit the power-conservation mode.

In one embodiment of the invention, the operating system activating a screen saver program as has been described is stored on a computer-readable media. The invention is not limited to any particular computer-readable media. However, preferably such computer-readable media is insertable into and thus represented by one of storage devices 48. For example, the computer-readable media is a floppy disk for insertion into the FDD, or a tape cartridge for insertion into the tape cartridge drive. Because an HDD is also referred to as a computer-readable media, in one embodiment one of storage devices 48 is the computer-readable media as well.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the following claims and equivalents thereof.

I claim:

1. A method of operating a computer, the computer having a display, an input device, a storage device, and an executable screen saver program for protecting the display or obscuring the displayed image, the method comprising:

detecting inactivity of the input device of the computer for a first predetermined period of time;

determining whether there is inactivity of the storage device of the computer for a second predetermined period of time;

when the determining element is true, executing the screen saver program; and when the determining element is false, repeating the detecting and determining elements.

2. The method of claim 1, wherein executing the screen saver program includes storing a first screen of information and displaying a second predetermined screen of information.

3. The method of claim 1, wherein detecting inactivity of the input device of the computer for a first predetermined period of time includes monitoring elapsed time since a predetermined activity, wherein the predetermined activity is activity of a device selected from the group consisting of a keyboard, a mouse input device, a touch pad, a wheel, a joystick, a point stick, or a trackball.

4. The method of claim 1, wherein determining whether there is inactivity of the storage device of the computer for a second predetermined period of time includes monitoring elapsed time since a disk drive access, disk read operation or disk write operation.

5. A computerized system, comprising:

processor means for executing an operating system;

display means coupled to the processor means for video display of information to a user, the display means having at least one synchronization line;

input means coupled to the processor means for receiving a user-controlled input;

storage means coupled to the processor means for storage of information accessible to the processor means;

programing means operated by the processor means, the programing means for detecting inactivity of the input means for a first predetermined period of time;

determining whether there is inactivity of the storage means for a second predetermined period of time;

when the determining element is true, changing the video display of information; and when the determining element is false, repeating the detecting and determining elements.

6. A computer readable medium useful in association with a computer which includes a processor, a memory, a display, an input device, and a storage device, the computer readable medium including computer instructions which are configured to cause the computer to perform the method of:

detecting inactivity of the input device of the computer for a first predetermined period of time;

determining whether there is inactivity of the storage device of the computer for a second predetermined period of time;

when the determining element is true, storing a first screen of information and displaying a second predetermined screen of information; and when the determining element is false, repeating the detecting and determining elements.

7. The computer readable memory of claim 6, wherein detecting inactivity of the input device of the computer for a first predetermined period of time includes monitoring elapsed time since a predetermined activity, wherein the predetermined activity is activity of a device selected from the group consisting of a keyboard, a mouse input device, a touch pad, a wheel, a joystick, a point stick, or a trackball.

8. The computer readable memory of claim 6, wherein determining whether there is inactivity of the storage device of the computer for a second predetermined period of time includes monitoring elapsed time since a disk drive access, disk read operation or disk write operation.

* * * * *